Dec. 19, 1967 D. E. McELROY 3,358,362

METHOD OF MAKING AN ELECTRICAL RESISTOR

Filed Jan. 21, 1965

2 Sheets-Sheet 1

INVENTOR
DAVID E. McELROY

BY [signature]

ATTORNEY

METHOD OF MAKING AN ELECTRICAL RESISTOR

Filed Jan. 21, 1965 2 Sheets-Sheet 2

INVENTOR
DAVID E. McELROY
BY Donald S. Cohen
ATTORNEY

United States Patent Office 3,358,362

Patented Dec. 19, 1967

3,358,362

METHOD OF MAKING AN ELECTRICAL RESISTOR

David E. McElroy, Oreland, Pa., assignor to International Resistance Company, Philadelphia, Pa.

Filed Jan. 21, 1965, Ser. No. 426,754
7 Claims. (Cl. 29—621)

ABSTRACT OF THE DISCLOSURE

A method of making electrical resistor comprising the steps of coating a plurality of elongated, cylindrical ceramic rods with a film of an electrical resistance material. The rods are arranged in closely spaced, parallel relation and then encapsulated in a block of plastic material. The block is then cut completely therethrough at longitudinally spaced points along planes perpendicular to the longitudinal axes of the rods to form a plurality of wafers each of which contains a plurality of coated substrate. The wafers are immersed in a solvent which dissolves the plastic but does not affect the material of the substrate and the resistance film for a period sufficient to remove a layer of the plastic and expose a portion of the resistance material film at each end of each of the substrates. The exposed ends of the substrates and the resistance material films are then simultaneously coated with a film of an electrically conductive metal. A layer of an electrically conductive solder is then coated over the metal films on the substrates. The coated substrates are then separated from the plastic wafer by immersing the wafer in a solvent until the plastic is dissolved. A separate, headed terminal wire is then bonded to the solder layer at each end of each of the substrates and a protective jacket of an electrical insulating plastic is provided around each of the substrates.

The present invention relates to an electrical resistor and the method of making the same. More particularly, the present invention relates to a film type electrical resistor, and a method of electrically terminating the resistor suitable for mass production of the resistor.

Film type electrical resistors in general comprise a cylindrical rod of an electrical insulating material, such as a ceramic, having a film of an electrical resistance material coated on its cylindrical surface, and a separate terminal wire mechanically connected to each end of the rod and electrically connected to the resistance film. A protective jacket or coating of plastic is provided around the ceramic rod and resistance film leaving the terminal wires exposed. A major problem in the mass production of such electrical resistors is the means of attaching the terminals to the resistor. In designing the termination for such resistors, the following major factors must be considered.

(1) The mechanical connection between the terminal wires and the ceramic rod must be mechanically strong to prevent the connection from being broken during handling and use of the resistor.

(2) There must be a good electrical connection between the terminal wires and the resistance film to provide low contact resistance and electrical noise. Since the resistance film is relatively thin, it is preferable to make the electrical connection to the resistance film along the outer cylindrical surface of the resistance film. However, the amount of area of the resistance film used to make the electrical connection must be kept at a minimum to obtain a maximum active area of the resistance film. Also, the active area of the resistance film must be uniform on all the resistors being made so as to produce large quantities of resistors of the same resistance value.

(3) The connection between the terminal wires and the ceramic body should be of minimum volume so that the protective jacket can be of sufficient thickness to provide the desired protection, yet the size of the completed resistor is maintained at a minimum.

(4) The method of attaching the terminal wires to the ceramic body and resistance film should be inexpensive to carry out on a mass production basis so that the cost of manufacturing the resistors is minimized.

It is an object of the present invention to provide a novel film type resistor which can be mass produced relatively inexpensively.

It is another object of the present invention to provide a novel termination for a film type electrical resistor which provides a good mechanical and electrical connection between the terminal wires and the body of the resistor and which does not substantially increase the size of the resistor.

It is a further object of the present invention to provide a novel method of making a film type resistor.

It is a still further object of the present invention to provide a novel method of attaching terminal wires to a film type electrical resistor.

Other objects will appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings, in which.

Figure 1:
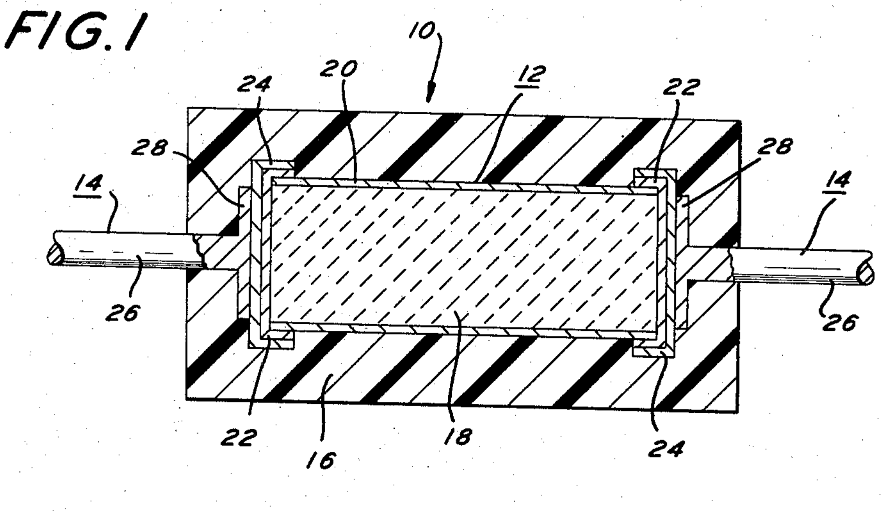
FIGURE 1 is a sectional view of a resistor of the present invention.

Referring initially to FIGURE 1 of the drawings, the resistor of the present invention is generally designated as 10. In general, resistor 10 comprises a resistance element 12, a separate terminal 14 mechanically and electrically secured to each end of the resistance element 12, and a protective jacket 16 surrounding the resistance element 12.

The resistance element 12 comprises a short, solid, cylindrical substrate 18 of an electrical insulating material, such as a ceramic. A thin film 20 of a resistance material is coated on the cylindrical surface of the substrate 18. The resistance material film 20 may be of any well known electrical resistance material, such as carbon, a metal or an alloy or mixture of metals, either per se or dispersed in a suitable binder, such as a plastic or glass. A separate termination film 22 of an electrically conductive metal, such as copper or nickel, is coated on each end of the substrate 18. Each of the termination films 22 extends across an end of the substrate 18 and over a short portion of the resistance material film 20 so that the termination films are electrically connected to the resistance material film. A layer 24 of an electrically conductive solder is coated over each of the termination films 22. Resistance element 12 can be made as small as .180 inch in length and .063 inch in diameter.

Each of the terminals 14 comprises an elongated wire 26 of an electrically conductive metal having a flat, circular head 28 at one end thereof. The terminal head 28 is of a diameter no greater than the diameter of the substrate 18. The head 28 of each of the terminals 14 is seated against and bonded to the solder layer 24 at the end of the resistance element 12 with the terminal wires 26 extending from the opposite ends of the resistance element substantially along the longitudinal axis of the substrate 18. Thus, the terminals 14 are mechanically secured to the resistance element 12 and are electrically connected to the resistance material film 20 through the solder layers 24 and the termination films 22.

The protective jacket 16 is of an electrically insulating plastic, such as formaldehyde, epoxy or silicone resin, which is molded, cast or coated around the resistance element 12. The protective jacket completely surrounds the resistance element 12, the terminal heads 28 and a short length of the terminal wires 26, leaving the major portion of the terminal wires projecting therefrom. Since the terminals 14 do not extend over the cylindrical surface of the resistance element 12, the protective jacket 16 is of substantially uniform thickness along the entire length of the resistance element so as to provide maximum protection for a minimum thickness of the jacket. After the protective jacket 16 is applied to the resistance element 12, the resistor 10 can be as small as .250 inch in length, excluding the length of the terminals 14, and .090 inch in diameter.

Figure 2:
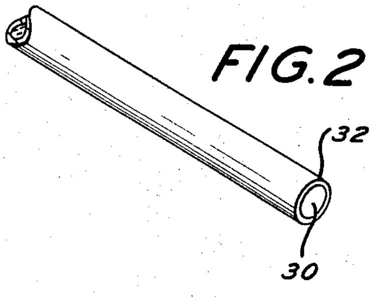
FIGURE 2 is a perspective view of a portion of a coated rod from which the resistor of the present invention is made and illustrates the first step in the method of the present invention.

To make the resistor 10 according to the method of the present invention, an elongated rod 30 (FIGURE 2) of the material of the substrate 18 is coated with a film 32 of the resistance material. The rod 30 is of the same diameter as the substrate 18, but many times longer than the substrate. The resistance material film 32 can be applied to the rod 30 by dipping, painting, spraying or any other coating method well known in the art of applying the particular resistance material used. If necessary, the resistance material film 32 is dried, cured or fired to complete the coating operation.

Figure 3:
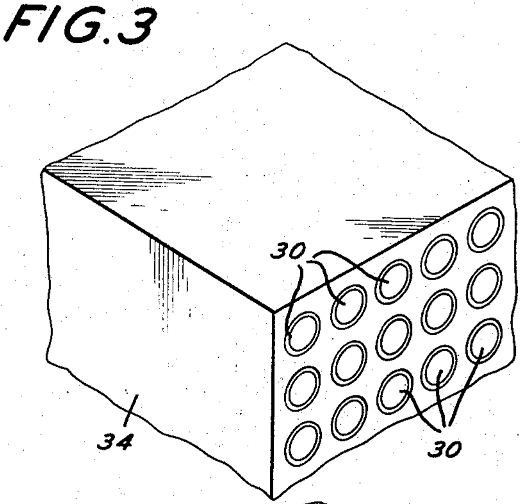
FIGURE 3 is a perspective view illustrating the second step of the method of the present invention in which a plurality of coated rods are encapsulated in a plastic block.

A plurality of the coated rods 30 are then arranged in closely spaced parallel relation and encased in a block 34 of a plastic material as shown in FIGURE 3. The plastic material of the block 34 is one which is relatively inexpensive and which is controllably soluble in a solvent which does not attack the material of either the resistance material film 32 or the rod 30. Polyester resins have been found suitable for this purpose. However, epoxy, polyurethane, silicone and thermoplastic resins, as well as such waxes as candle wax, can also be used. As many as 100 rods 30 can be included in the block 34.

Figure 4:
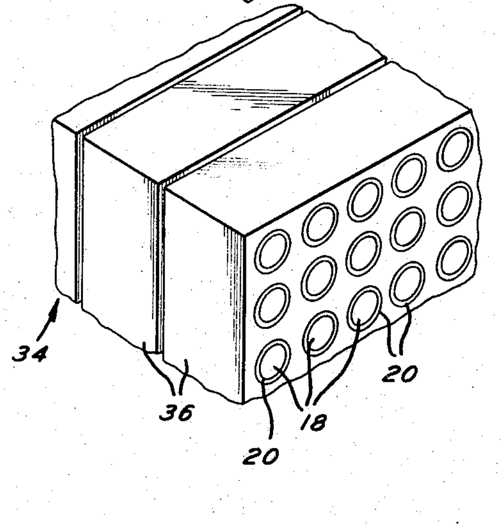
FIGURE 4 is a perspective view illustrating the next step of the method of the present invention in which the block shown in FIGURE 3 is divided into a plurality of short wafers.

As shown in FIGURE 4, the block 34 is then cut completely therethrough at uniformly spaced points along its length along parallel planes which are perpendicular to the longitudinal axes of the rods 30. The cuts can be made by any suitable cutting tool, such as a rotating circular saw. The cuts are spaced apart a distance equal to the desired length of the substrates 18 of the resistor 10. Thus, the block 34 is divided into a plurality of wafers 36 with each wafer containing a plurality of coated substrates 18.

Figures 5, 6, 7, 8, 9, 10:
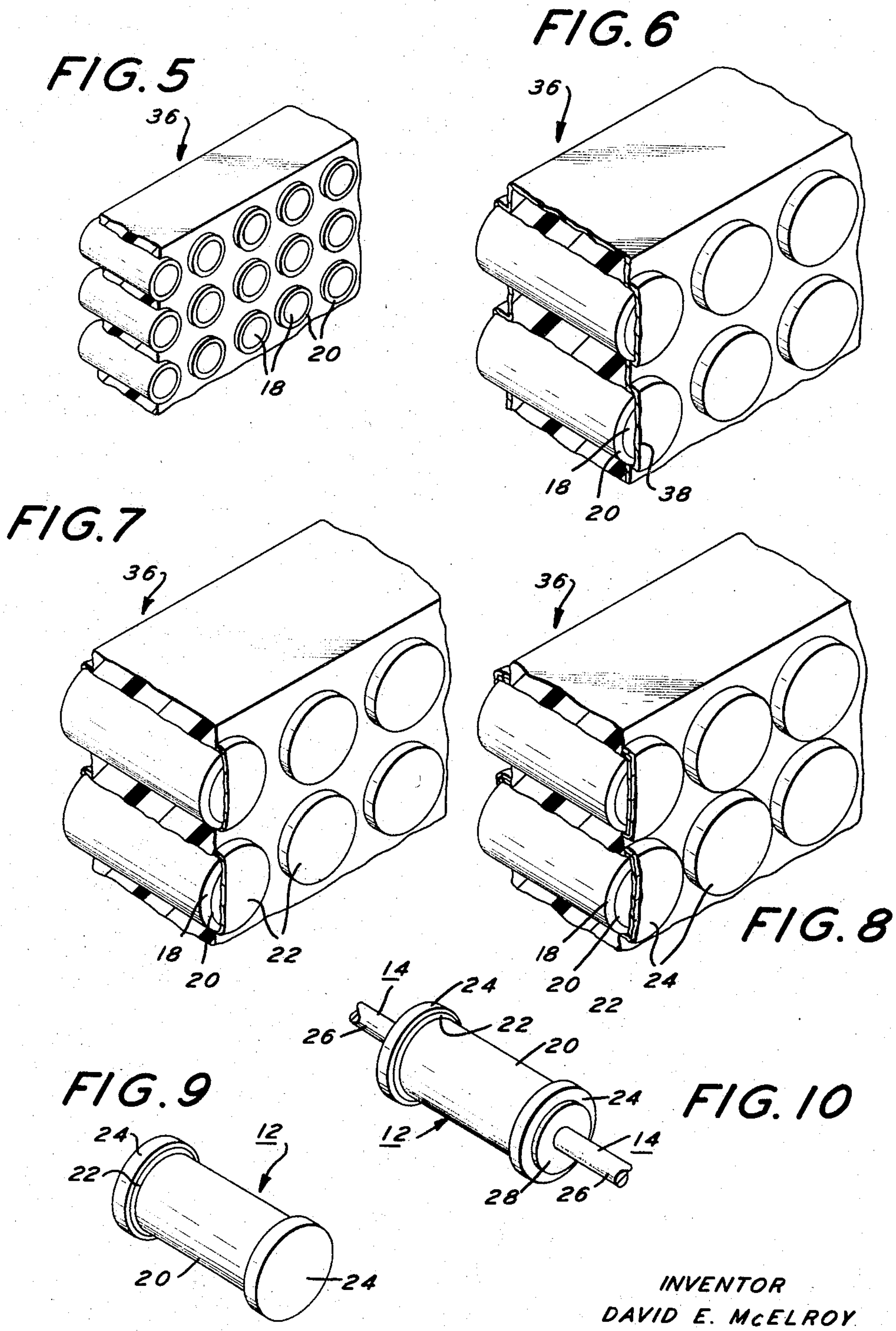
FIGURE 5 is a perspective view of a wafer illustrating the next step in the method of the present invention in which the end portions of the resistor elements are exposed.
FIGURE 6 is a perspective view of the wafer shown in FIGURE 5, illustrating the next step in the method of the present invention in which the wafer and the exposed ends of the resistor elements are coated with a metal film.
FIGURE 7 is a perspective view of the wafer shown in FIGURE 6 illustrating the next step in the method of the present invention in which the metal film is removed from the wafer.
FIGURE 8 is a perspective view of the wafer shown in FIGURE 7, illustrating the next step of the method of the present invention in which the ends of the resistor elements are coated with a layer of solder.
FIGURE 9 is a perspective view of a resistor element removed from the wafer.
FIGURE 10 is a perspective view of the resistor element shown in FIGURE 9 with the terminals attached thereto.

Each wafer 36 is then immersed in a suitable solvent for a period of time necessary to dissolve or soften the surface of the plastic material. As previously stated, the solvent is one which will slowly dissolve the particular plastic being used but does not attack the material of either the substrate 18 or the resistance films 20. When the plastic is a polyester resin, methylene chloride has been found to be a satisfactory solvent. Chlorinated solvents can be used for epoxy and silicone resins, alcohols or ketones for polyurethane, and various hydrocarbon solvents for waxes. When the wafers 36 are removed from the solvent, they are washed with water to remove the softened surface layer of the plastic and any of the solvent. This exposes a portion of the resistance material film 20 at each end of each of the substrates 18 as shown in FIGURE 5. The amount of the resistance material films 20 which are exposed will depend on the length of time that the wafers 16 are immersed in the solvent. Using methylene chloride as the solvent for a polyester resin, leaving the wafer 36 in the solvent for approximately ten minutes will dissolve a sufficient amount of the plastic to expose approximately ten mils of the resistance material film at each end of each of the substrates.

As shown in FIGURE 6, a film 38 of an electrically conductive metal, such as copper or nickel, is then coated over the entire surface of each of the wafers 36 including the exposed ends of the resistance material films 20 and the ceramic substrates 18. Although the metal film 38 can be coated on the wafer 36 by any well-known coating process for the particular metal, the process of electroless plating is preferred because of the ease and quickness that the metal film can be achieved by this process. To coat the wafer 36 with the metal film 38 by electroless plating, any of the well-known electroless plating baths and processes can be used, such as those disclosed in United States Letters Patents No. 3,075,855 to M. C. Agens, issued Jan. 29, 1963, entitled, "Copper Plating Process and Solutions," No. 3,095,309 to R. J. Zellisky et al., issued June 25, 1963, entitled, "Electroless Copper Plating," and No. 2,968,578 to J. M. Mochal, issued Jan. 17, 1961, entitled, "Chemical Nickel Plating on Ceramic Material."

After the wafer 36 is coated with the metal film 38, the wafer is again immersed in the solvent for a period of time necessary to dissolve or soften the surface of the plastic beneath the metal film. The wafer 36 is then removed from the solvent and washed. When the surface of the plastic is dissolved or softened, the portion of the metal film 38 coating the plastic becomes broken and is washed away, leaving the metal film only on the exposed ends of the resistance metal films and the ceramic substrates. Thus, as shown in FIGURE 7, the resistance elements are provided with the termination films 22.

The end surfaces of the wafer 36 from which the resistance elements project are then individually immersed in a bath of molten solder. Since the solder will only adhere to a metal surface, only the termination films 22 become coated with the solder to provide the solder layer 24 on each end of each of the resistance elements, as shown in FIGURE 8. The wafer 36 is then again immersed in the solvent bath and left in the solvent until all of the plastic is dissolved so as to separate the individual resistance elements 12 in the wafer. After the plastic is completely dissolved, the individual resistance elements 12 shown in FIGURE 9 are removed from the solvent and washed to remove the solvent. The terminals 14 are then attached to the ends of the resistance element 12. This is accomplished by placing the head 28 of a terminal 14 in abutting relation to the solder layer 24 at each end of the resistance element 12, as shown in FIGURE 10 and then heating the assembly to soften the solder and bond the terminals to the resistance element. The terminals 14 can be attached to the resistance element 12 on a continuous, mass production basis by means of suitable trays or a conveyor belt on which the resistance elements and terminals are placed in proper abutting relation, and which carries the assemblies through a furnace or under a heater to bond the terminals to the resistance elements. The protective jacket 16 is then molded, cast or otherwise formed around the resistance element 12 to complete the resistor 10. The method of the present invention for making the resistors 10 on a mass production basis has the following advantages:

(1) Because of the small size of the substrates 18, it is much easier to handle the wafers 36, which contain a plurality of the substrates, during the application of the termination films and solder layers than it is to handle the individual substrates.

(2) By cutting the wafers from the large block, all of the substrates in each wafer are of uniform length.

(3) By treating the entire wafer with the solvent to expose the end portions of the coated substrates, the length of the exposed end portions is not only uniform at each end of each of the substrates, but is uniform on all of the substrates in the wafer. Thus, the active area of the resistance film is uniform in all of the resistance elements in the wafer.

(4) By the use of the wafers, a plurality of the coated substrates are simultaneously subjected to each step of the method of the present invention, so that a desired quantity of the resistors are manufactured quicker than if the coated substrates were individually subjected to the various steps.

(5) Since a plurality of the coated substrates are simultaneously subjected to each step of the method of the present invention, the cost of manufacture per resistor is considerably less than if the substrates were individually subjected to the various steps.

Thus the method of the present invention provides for the mass production of the resistors 10 with greater ease of handling the parts, with greater speed, at a lower cost per resistor and with uniformity of active area of the resistance film.

The present invention may be embodied in other specific forms without departing from the spirit or essential attributes thereof and, accordingly, reference should be made to the appended claims, rather than to the foregoing specification as indicating the scope of the invention.

I claim:

1. A method of making electrical resistors comprising the steps of:

coating the surface of each of a plurality of elongated, cylindrical ceramic rods with a film of an electrical resistance material;

arranging said coated rods in closely spaced parallel relation;

encapsulating said coated rods in a block of a plastic material;

cutting through said block and the coated rods at longitudinally spaced points along planes perpendicular to the longitudinal axes of said rods to form a plurality of wafers, each of which contains a plurality of coated substrates;

removing from the surface of each of said wafers a layer of the plastic to expose a portion of the resistance material film at each end of each of said substrates;

simultaneously coating the exposed surfaces of the substrates and the resistance material films of each of said wafers with a film of an electrically conductive metal;

then coating each of said metal films with a layer of an electrically conductive solder; and then separating said coated substrate from the plastic of its respective wafers.

2. The method of making electrical resistors in accordance with claim 1 in which the layer of the plastic on the surface of the wafers is removed to expose a portion of the resistance material at each end of each of the substrates by immersing the wafers in a solvent which dissolves the plastic but does not affect the material of the substrates and the resistance films.

3. The method of making electrical resistors in accordance with claim 2 in which the electrically conductive metal film is coated over the entire surface of the wafer including the exposed surfaces of the substrates and the resistance material films, and then removing the portion of the metal film on the surface of the plastic of the wafer, leaving the metal film only on the exposed surfaces of the substrates and the resistance films.

4. The method of making electrical resistors in accordance with claim 3 in which the metal film is removed from the surface of the plastic of the wafer by immersing the wafer to a solvent which dissolves the plastic but does not affect the material of the substrates, the resistance films and the metal film, leaving the wafers in the solvent for a period of time sufficient to dissolve a layer of the plastic beneath the metal film, removing the wafer from the solvent, and then washing the wafer to remove the metal film on the plastic.

5. A method of making electrical resistors in accordance with claim 4 in which all of the substrates which are projecting from the same end of the wafers are simultaneously coated with the solder layer.

6. A method of making electrical resistors in accordance with claim 5 in which the coated substrates are separated from the plastic of the respective wafers by immersing the wafer in a solvent for a period of time sufficient to completely dissolve the plastic.

7. A method of making electrical resistors in accordance with claim 1 in which, after the coated substrates are separated from the wafers, a separate headed terminal wire is bonded to the solder layer on each end of each of the substrates, and then a protective jacket of an electrical insulating plastic is provided completely around each of the substrates.

References Cited

UNITED STATES PATENTS

| | | | |
|---|---|---|---|
| 2,752,662 | 7/1956 | Crooks et al. | |
| 2,803,729 | 8/1957 | Kohring | 338—308 X |
| 3,078,549 | 2/1963 | Wende | 29—418 X |
| 3,107,337 | 10/1963 | Kohring | 338—308 |
| 3,252,205 | 5/1966 | Hancock et al. | 29—424 X |

JOHN F. CAMPBELL, *Primary Examiner.*

J. CLINE, *Assistant Examiner.*